United States Patent
Ranjan et al.

(10) Patent No.: US 11,774,148 B2
(45) Date of Patent: Oct. 3, 2023

(54) SYSTEM AND METHOD FOR REMOVING NONCONDENSING GAS FROM REFRIGERATION SYSTEM

(71) Applicant: Carrier Corporation, Palm Beach Gardens, FL (US)

(72) Inventors: Rajiv Ranjan, South Windsor, CT (US); Ying She, East Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/973,697

(22) PCT Filed: May 29, 2020

(86) PCT No.: PCT/US2020/035044
§ 371 (c)(1),
(2) Date: Dec. 9, 2020

(87) PCT Pub. No.: WO2020/247247
PCT Pub. Date: Dec. 10, 2020

(65) Prior Publication Data
US 2022/0186995 A1    Jun. 16, 2022

Related U.S. Application Data
(60) Provisional application No. 62/857,626, filed on Jun. 5, 2019.

(51) Int. Cl.
*F25B 43/04*    (2006.01)
*B01D 19/00*    (2006.01)
*F25B 43/00*    (2006.01)

(52) U.S. Cl.
CPC ........ *F25B 43/043* (2013.01); *B01D 19/0031* (2013.01); *F25B 43/003* (2013.01)

(58) Field of Classification Search
CPC ........................... F25B 43/043; F25B 43/003
See application file for complete search history.

(56) References Cited

U.S. PATENT DOCUMENTS 4,581,903 A * 4/1986 Kerry .................... F25B 43/003
  62/298
5,062,273 A * 11/1991 Lee ...................... B01D 53/229
  62/85

(Continued)

FOREIGN PATENT DOCUMENTS

EP    1681523 A1    7/2006
EP    3483527 A1    5/2019

OTHER PUBLICATIONS

ISR/WO; PCT/US2020/035044; mailed Sep. 9, 2020; 12 pages.

*Primary Examiner* — David J Teitelbaum
(74) *Attorney, Agent, or Firm* — CANTOR COLBURN LLP

(57) ABSTRACT

Disclosed is a refrigeration system comprising: condenser; an expansion valve; a first conduit fluidly connecting the condenser and the expansion valve to define a first fluid segment through which a medium is transported when the system is active; and a separator assembly, operably disposed in the first fluid segment, configured to remove non-condensable gas from the medium when the system is active.

20 Claims, 3 Drawing Sheets

(56) References Cited

U.S. PATENT DOCUMENTS

| | | | |
|---|---|---|---|
| 5,089,033 A * | 2/1992 | Wijmans | B01D 53/22 95/48 |
| 2003/0179530 A1* | 9/2003 | Neubert | B01D 69/02 361/103 |
| 2018/0066880 A1* | 3/2018 | Ranjan | B01D 19/0031 |
| 2018/0187935 A1 | 7/2018 | Stark | |

* cited by examiner

SYSTEM AND METHOD FOR REMOVING NONCONDENSING GAS FROM REFRIGERATION SYSTEM

CROSS REFERENCE TO RELATED APPLICATIONS

This is a US National Stage of Application No. PCT/US2020/035044, filed on May 29, 2020, which claims the benefit of Provisional Application No. 62/857,626 filed Jun. 5, 2019, the disclosures of which are incorporated herein by reference.

BACKGROUND

The embodiments herein relate to refrigeration systems and more specifically to a system and method for removing noncondensing gas from a refrigeration system.

Removal of non-condensable gases from refrigerants is important as the gases migrate to low-pressure refrigerants for large centrifugal refrigeration systems. One solution uses a purge pump-based system. Such purge systems, however, maybe undesirably complex and waste refrigerant.

BRIEF SUMMARY

Disclosed is a refrigeration system comprising: condenser; an expansion valve; a first conduit fluidly connecting the condenser and the expansion valve to define a first fluid segment through which a medium is transported when the system is active; and a separator assembly, operably disposed in the first fluid segment, configured to remove non-condensable gas from the medium when the system is active.

In addition to one or more of the above features or as an alternate the separator assembly includes a pump configured to generate negative pressure, thereby extracting non-condensable gas from the medium through the separator when the system is active.

In addition to one or more of the above features or as an alternate the separator assembly comprises a membrane with a pore size that is selectively tunable within a range having a low end and a high end; and the low end being smaller than a molecular size of the medium when the medium is flowing in the first fluid segment of the system and the high end being larger than the molecular size of the medium when the medium is flowing in the first fluid segment of the system.

In addition to one or more of the above features or as an alternate the separator assembly is reactive to heat for tuning the pore size of the membrane.

In addition to one or more of the above features or as an alternate the membrane comprises zeolite.

In addition to one or more of the above features or as an alternate the separator assembly comprises a first housing for housing the membrane; and the first housing being coupled to the first fluid segment of the system, the separator assembly being disposed in the first housing.

In addition to one or more of the above features or as an alternate the separator assembly comprises a cartridge that includes the membrane, the cartridge being removably disposed in the first housing.

In addition to one or more of the above features or as an alternate the first housing includes a selectively controllable heating source.

In addition to one or more of the above features or as an alternate the system includes a sensor operationally connected to the heating source, the senor configured to sense non-condensable gas in the medium when the system is active; and the heating source is configured to provide heat for tuning the pore size of the membrane responsive to the sensor sensing non-condensable gas in the medium.

In addition to one or more of the above features or as an alternate the sensor is operationally connected to the system, outside of the first fluid segment of the system.

In addition to one or more of the above features or as an alternate further including an evaporator; and a second conduit fluidly connecting the expansion valve and the evaporator to define a second fluid segment of the system; wherein the sensor is operationally connected to the second fluid segment of the system.

In addition to one or more of the above features or as an alternate the system includes a cooling circuit, operationally connected to the first fluid segment between the condenser and the separator assembly, configured to pre-concentrate the non-condensable gas in the medium when the system is active.

In addition to one or more of the above features or as an alternate the cooling circuit includes a second housing operationally connected to the first fluid segment of the system, the second housing including a heat exchanger configured for thermodynamically engaging the medium when the cooling circuit is active.

In addition to one or more of the above features or as an alternate the sensor is operationally connected to the cooling circuit; and the cooling circuit is configured to activate responsive to the sensor sensing non-condensable gas in the medium.

In addition to one or more of the above features or as an alternate the system includes a bypass conduit, fluidly connected in parallel with the first conduit, between the condenser and the separator assembly, the bypass conduit being configured for at least partially bypassing the first conduit.

In addition to one or more of the above features or as an alternate the first conduit and the bypass conduit include a respective plurality of control valves that selectively control flow of the medium between condenser and the separator assembly; whereby flow of the medium between the condenser and the expansion valve is through one or both of the first conduit and the bypass conduit when the system is active.

In addition to one or more of the above features or as an alternate the sensor is operationally connected to the plurality of control valves; and one of the control valves is configured to transition to an opened state and another of the control valves is configured to transition to a closed state, or both of the control valves are configured to be at least partially opened, responsive to the sensor sensing non-condensable gas in the medium when the system is active.

In addition to one or more of the above features or as an alternate the medium is refrigerant.

Further disclosed is a method of treating a medium in a refrigeration system: fluidly transporting the medium along a first fluid segment of the system between a condenser and an expansion valve; and providing negative pressure to a separator assembly that is in fluid communication with the first fluid segment of the system.

In addition to one or more of the above features or as an alternate the method includes determining an amount of non-condensable gas that is in the medium; and heating the separator assembly and/or pre-concentrating the non-condensable gas in the medium within the first fluid segment.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
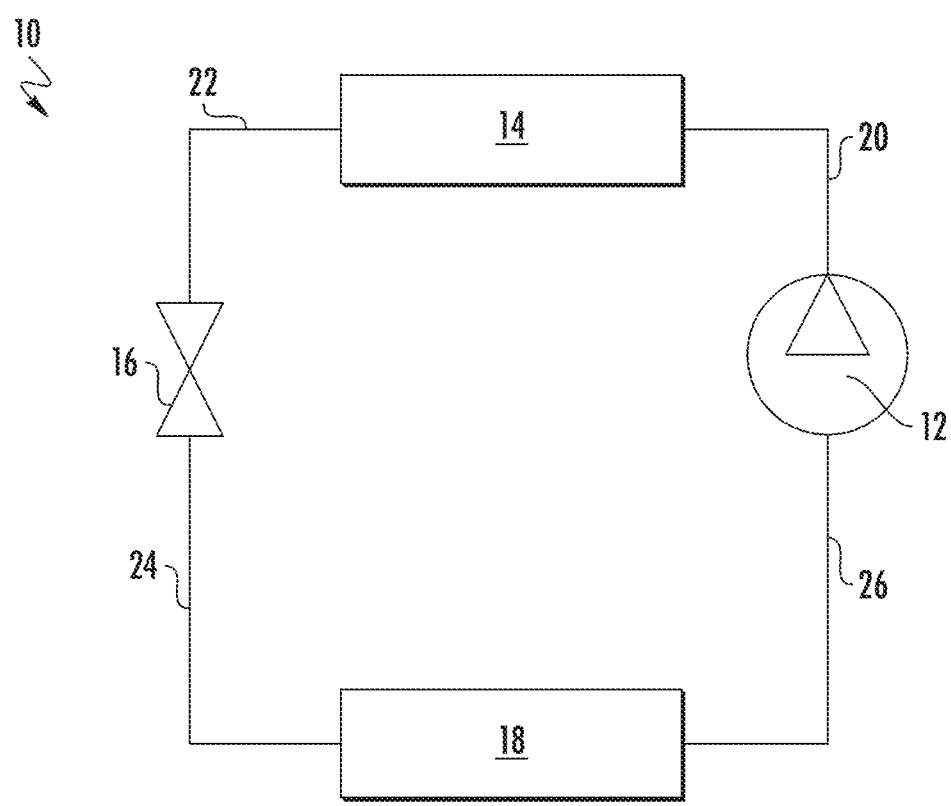
FIG. 1 is a schematic diagram of a vapor compression system of a refrigerant system.

Referring now to FIG. 1, an example of a heat pump 10 is illustrated. As used herein, the term heat pump is intended to include any system capable of heating and/or cooling, such as a vapor compression system, a sorption system, a geothermal system, a waste heat recovery system, a heat based cooling system, and a heating system. As shown, the heat pump 10 includes a compressor 12, a condenser 14, an expansion valve 16, and an evaporator 18 arranged to form a fluid loop. The compressor 12 pressurizes heat transfer fluid in its gaseous state, which both heats the fluid and provides pressure to circulate it through the system. In some embodiments, the heat transfer fluid, or refrigerant, includes an organic compound. For example, in some embodiments, the refrigerant comprises at least one of a hydrocarbon, substituted hydrocarbon, a halogen-substituted hydrocarbon, a fluoro-substituted hydrocarbon, or a chloro-fluoro-substituted hydrocarbon.

The hot pressurized gaseous heat transfer fluid exiting from the compressor 12 flows through a conduit 20 to a heat rejection heat exchanger such as condenser 14. The condenser is operable to transfer heat from the heat transfer fluid to the surrounding environment, resulting in condensation of the hot gaseous heat transfer fluid to a pressurized moderate temperature liquid. The liquid heat transfer fluid exiting from the condenser 14 flows through conduit 22 to expansion valve 16, where the pressure is reduced. The reduced pressure liquid heat transfer fluid exiting the expansion valve 16 flows through conduit 24 to a heat absorption heat exchanger such as evaporator 18. The evaporator 18 functions to absorb heat from the surrounding environment and boil the heat transfer fluid. Gaseous heat transfer fluid exiting the evaporator 18 flows through conduit 26 to the compressor 12, so that the cycle may be repeated.

The heat pump 10 has the effect of transferring heat from the environment surrounding the evaporator 18 to the environment surrounding the condenser 14. The thermodynamic properties of the heat transfer fluid must allow it to reach a high enough temperature when compressed so that it is greater than the environment surrounding the condenser 14, allowing heat to be transferred to the surrounding environment. The thermodynamic properties of the heat transfer fluid must also have a boiling point at its post-expansion pressure that allows the temperature surrounding the evaporator 18 to provide heat to vaporize the liquid heat transfer fluid.

Various types of refrigeration systems may be classified as a heat pump 10 as illustrated and described herein. One such refrigeration system is a chiller system. Portions of a refrigeration system, such as the cooler of a chiller system for example, may operate at a low pressure (e.g., less than atmosphere) which can cause contamination (e.g., ambient air) to be drawn into fluid loop of the heat pump 10. The contamination degrades performance of the refrigeration system.

Figure 2:
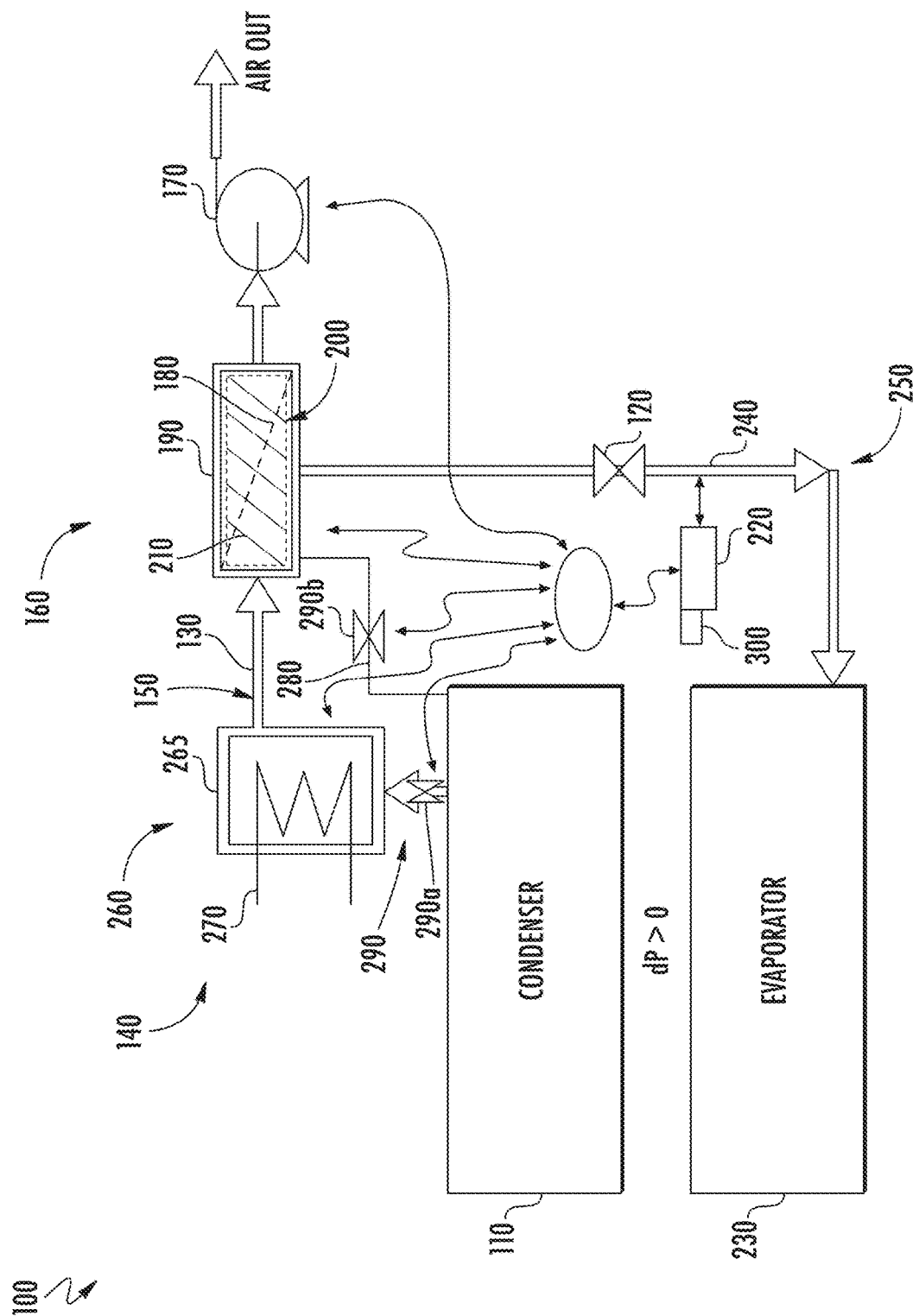
FIG. 2 illustrates a refrigeration system according to an embodiment.

A refrigerant system (system) 100 is disclosed in FIG. 2, which may also be known as a refrigeration circuit and may be configured as a vapor compression cycle (VCC). The system 100 includes a condenser 110 and an expansion valve 120. A first conduit 130 fluidly connects the condenser 110 and the expansion valve 120 to define a first fluid segment 140 of the system 100. A medium 150 is transported within the first fluid segment 140 when the system 100 is active. The medium 150 may be refrigerant.

According to an embodiment, a separator assembly 160 is provided, which functions as a purge collector as disclosed herein. The separator assembly 160 is operably disposed in the first fluid segment 140. The separator assembly 160 can be configured to operate under various driving forces including negative pressure. From this configuration the separator assembly 160 removes non-condensable gas from the medium 150 when the system 100 is active. The separator assembly 160 may include a pump 170 configured to generate negative pressure to extract the non-condensable gas from the medium 150 when the system 100 is active.

The separator assembly 160 may comprise a porous separator membrane (membrane) 180. A pore size of the membrane 180 is selectively tunable within a range having a low end and a high end. The low end is smaller than a molecular size of the medium 150 when the medium 150 is flowing in the first fluid segment 140 of the system 100. The high end is larger than the molecular size of the medium 150 when the medium 150 is flowing in the first fluid segment 140 of the system 100. With the larger molecular size, refrigerant may flow with the gas through the separator and out of the system, which may be desirable under certain conditions.

The separator assembly 160 is reactive to heat for tuning the pore size of the membrane 180. The membrane 180 may be zeolite. The separator assembly 160 may include a first housing 190 which is a membrane housing. The first housing 190 may be coupled to the first fluid segment 140 of the system 100. The separator assembly 160 may be disposed in the first housing 190. A cartridge 200 of the separator assembly 160 may include the membrane 180. The cartridge 200 may be removably disposed in the first housing 190. The first housing 190 may include a heating source 210 of the separator assembly 160, where the heating source 210 is selectively controllable. The heating source 210 may be an electrically controlled heating element or a diverted source of waste heat from elsewhere in the system 100.

A sensor 220 may be operationally connected to the heating source 210. The sensor 220 may be configured to sense non-condensable gas in the medium 150 when the system 100 is active. The heating source 210 may be configured to provide heat to enhance the performance of the membrane 180 responsive to the sensor 220 sensing non-condensable gas in the medium 150. The sensor 220 may be operationally connected to the system 100, at a location that is outside of the first fluid segment 140 of the system 100. A second conduit 240 may fluidly connect the expansion valve 120 and an evaporator 230 of the system 100 to define a second fluid segment 250 of the system 100. In one embodiment, the sensor 220 may be operationally connected to the second fluid segment 250 of the system 100.

A cooling circuit 260 may be provided. The cooling circuit 260 may be operationally connected to the first fluid segment 140 of the system 100 between the condenser 110 and the separator assembly 160. The cooling circuit 260 may be configured to pre-concentrate the non-condensable gas in the medium 150 when the system 100 is active. The cooling circuit 260 may include a second housing 265 operationally connected to the first fluid segment 140 of the system 100. The second housing 265 may include a heat exchanger 270 configured for thermodynamically engaging the medium 150 when the cooling circuit 260 is active. The sensor 220 may be operationally connected to the cooling circuit 260. The cooling circuit 260 may be configured to activate responsive to the sensor 220 sensing non-condensable gas in the medium 150.

A bypass conduit 280 may be fluidly connected in parallel with the first conduit 130, between the condenser 110 and the separator assembly 160. The bypass conduit 280 may be configured for at least partially bypassing the first conduit 130 in the first fluid segment 140, thereby at least partially bypassing the cooling circuit 260. The first conduit 130 and the bypass conduit 280 may include a respective plurality of control valves generally referred to as 290. The plurality of control valves may include a first control valve 290a for controlling flow through the first conduit 130 and a second control valve 290b for controlling flow through the bypass conduit 280. The plurality of control valves 290 may selectively control flow of the medium 150 between condenser 110 and the separator assembly 160. In one embodiment, flow of the medium 150 between the condenser 110 and the expansion valve 120 is through one of the first conduit 130 and the bypass conduit 280 when the system 100 is active. In this embodiment, one of the control valves 290 is configured to transition to an opened state and another of the control valves 290 is configured to concurrently transition to a closed state. Alternatively, to modulate conditions of the medium 150 into the separator assembly 160, the control valves 290 may be controlled to allow for medium 150 to flow through both cooling circuit 260 and the bypass conduit 280. The sensor 220 may be operationally connected to the plurality of control valves 290, and the control valves 290 may operate responsively to the sensor 220 sensing non-condensable gas in the medium 150 when the system 100 is active.

The sensor 220 may electrically communicate with the pump 170, the heating source 210, the cooling circuit 260, and the control valves 290, so that each, independently or together, is either on (active) or off (inactive). Alternatively such communications may occur electronically by use of one or more electronic processors to activate and control the pump 170, the heating source 210, the cooling circuit 260 and the control valves 290. Such communications may be direct, for example, with onboard controllers on each of these components including, for example controller 300 on the sensor 220, or through remotely located central controller (not illustrated).

In addition, control of the pump 170, the heating source 210, the cooling circuit 260 and the control valves 290 may be in accordance with a predefined schedule for different conditions. The different conditions may be based on, for example, environmental conditions, both short term (daily, hourly) and long term (weekly, monthly, seasonal). Conditions may include temperature, humidity, air quality, relative air density (relative to, for example, sea level). There may be conditions which require activating the pump 170 to remove gas through the separator assembly 160. There may be conditions that further require one or more of changing pore sizes in the membrane 180 and pre-condensing through the cooling circuit 260.

There may be other conditions where neither removing gas through the separator assembly 160 nor either of changing pore sizes in the membrane 180 and pre-condensing through the cooling circuit 260. In conditions where the chiller is operating with minimal air infiltration, the system may be set for a low gas removal rate with the expectation of obtaining high purge separation efficiency. Alternatively the chiller may be briefly shut off for a maintenance. In such circumstance, the system may be configured to obtain a moderate gas removal rate with the expectation of obtaining a moderate purge efficiency/emission rate. Alternatively, if the chiller has not been operating for an extended period of time, such as several months, a buildup of non-condensable gas may have occurred. In this scenario, a high gas removal rate, e.g., of the non-condensable gas, may be required at startup, though there may be a relative reduction in purge efficiency.

Figure 3:
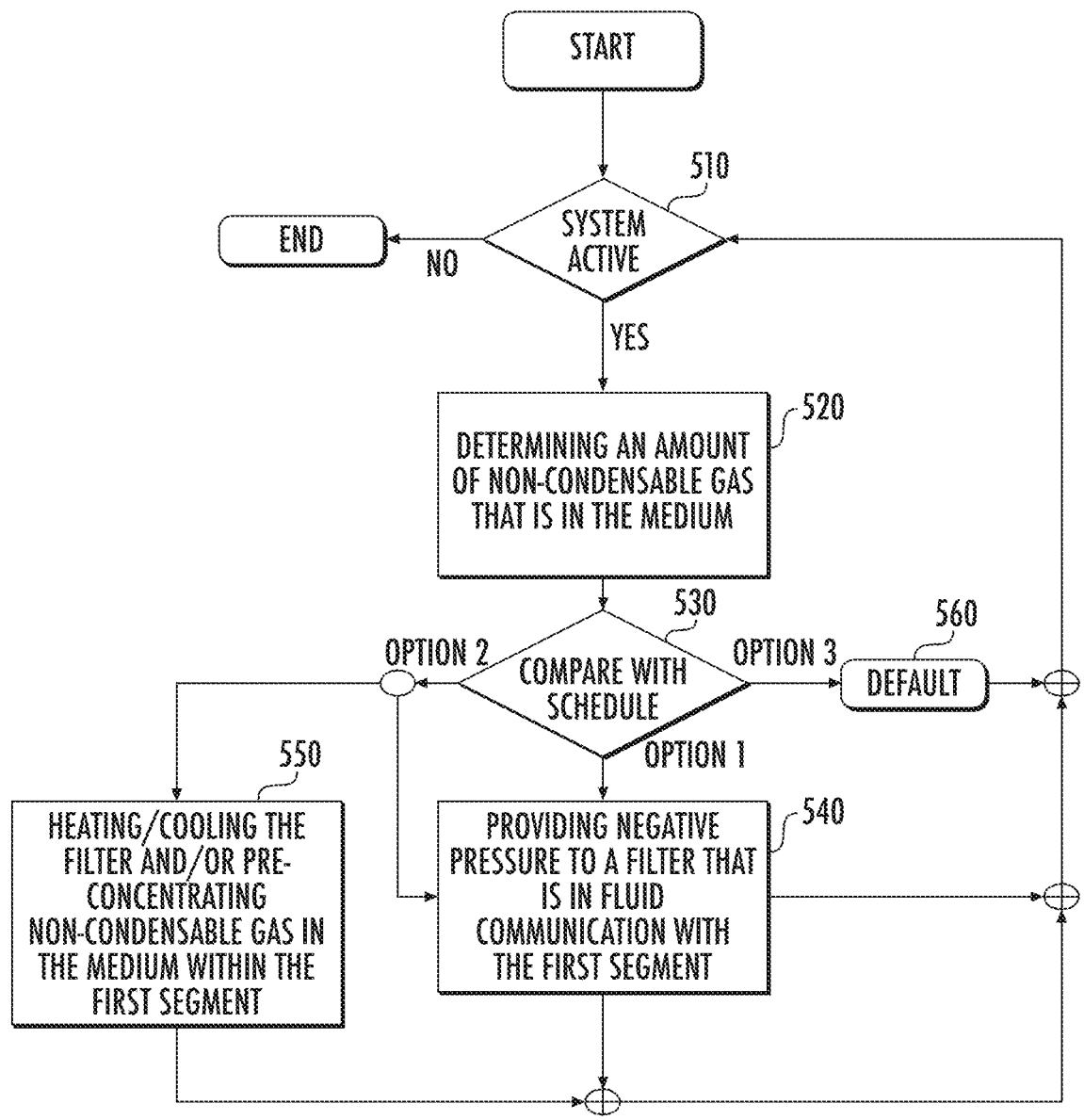
FIG. 3 illustrates a method of removing noncondensing gas from refrigeration system according to an embodiment.

Turning to FIG. 3, further disclosed is a method of treating the medium 150 in the system 100. Block 510 of the method includes activating the system 100 (YES at Block 510) so that the medium 150 is fluidly transport along the first fluid segment 140 of the system 100, between the condenser 110 and the expansion valve 120. The method continues to Block 520 until the system 100 is stopped (NO at Block 510).

Block 520 includes determining an amount of non-condensable gas that is in the medium 150. Block 530 includes comparing the determined amount of non-condensable gas in the medium 150 against a schedule illustrated in FIG. 3. If, according to the schedule, a first option ("Option 1") is selected, then at Block 540 negative pressure is provided to a separator assembly 160 that is in fluid communication with the first fluid segment 140 of the system. Then the method cycles back to Block 510. If, according to the schedule, a second option ("Option 2") is selected, then Block 540 is executed and, in addition, Block 550 is executed. Block 550 includes heating or cooling the separator assembly 160 and/or pre-concentrating the non-condensable gas in the medium 150 within the first fluid segment 140, for example, before reaching the separator assembly 160. Heating the separator assembly 160 includes, for example, energizing an electrically controlled heating element within the separator assembly 160 diverting waste heat from the system 100 toward the separator assembly 160. The method then cycles back to Block 510. If, according to the schedule, a third option ("Option 3") is selected then at Block 540 a default mode of operation is executed, and is again executed as indicated. The method then cycles back to Block 510.

With the above disclosed embodiments, removal of non-condensable gases from refrigerants is achieved by the use of a membrane. The system desirably reduces refrigerant waste found in other solutions. In addition, the disclosed embodiments, as implemented, have fewer impacts on a system longevity.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A refrigeration system comprising:
a condenser; an expansion valve;
a first conduit fluidly connecting the condenser and the expansion valve to define a first fluid segment through which a medium is transported when the system is active;
a separator assembly, operably disposed in the first fluid segment, configured to remove non-condensable gas from the medium when the system is active;
a cooling circuit, operationally connected to the first fluid segment between the condenser and the separator assembly, configured to pre-concentrate the non-condensable gas in the medium when the system is active, the cooling circuit includes a heat exchanger configured for thermodynamically engaging the medium when the cooling circuit is active; and
a bypass conduit, fluidly connected in parallel with the first conduit, between the condenser and the separator assembly, the bypass conduit being configured for at least partially bypassing the cooling circuit.

2. The system of claim 1, wherein:
the separator assembly includes a pump configured to generate negative pressure, thereby extracting the non-condensable gas from the medium through the separator assembly when the system is active.

3. The system of claim 1, wherein:
the separator assembly comprises a membrane with a pore size that is selectively tunable within a range having a low end and a high end; and
the low end being smaller than a molecular size of the medium when the medium is flowing in the first fluid segment of the system and the high end being larger than the molecular size of the medium when the medium is flowing in the first fluid segment of the system.

4. The system of claim 3, wherein:
the separator assembly is reactive to heat for tuning the pore size of the membrane.

5. The system of claim 3, wherein:
the membrane comprises zeolite.

6. The system of claim 3, wherein:
the separator assembly comprises a first housing for housing the membrane; and
the first housing being coupled to the first fluid segment of the system, the membrane being disposed in the first housing.

7. The system of claim 6, wherein:
the separator assembly comprises a cartridge that includes the membrane, the cartridge being removably disposed in the first housing.

8. The system of claim 6, wherein:
the first housing includes heating source that is a selectively controllable.

9. The system of claim 8, further comprising:
a sensor operationally connected to the heating source, the sensor configured to sense the non-condensable gas in the medium when the system is active; and
the heating source is configured to provide heat for tuning the pore size of the membrane responsive to the sensor sensing non-condensable gas in the medium.

10. The system of claim 9, wherein:
the sensor is operationally connected to the system, outside of the first fluid segment of the system.

11. The system of claim 9, further comprising:
an evaporator; and
a second conduit fluidly connecting the expansion valve and the evaporator to define a second fluid segment of the system;
wherein the sensor is operationally connected to the second fluid segment of the system.

12. The system of claim 9, wherein:
the first conduit and the bypass conduit include a respective plurality of control valves that selectively control flow of the medium between the condenser and the separator assembly;
whereby flow of the medium between the condenser and the expansion valve is through one or both of the first conduit and the bypass conduit when the system is active.

13. The system of claim 12, wherein:
the sensor is operationally connected to the plurality of control valves; and
one of the plurality of control valves is configured to transition to an opened state and another of the plurality of control valves is configured to transition to a closed state, or both of the plurality of control valves are configured to be at least partially opened, responsive to the sensor sensing non-condensable gas in the medium when the system is active.

14. The system of claim 6, wherein:
the cooling circuit includes a second housing operationally connected to the first fluid segment of the system, the second housing including the heat exchanger.

15. The system of claim 1, wherein:
the sensor is operationally connected to the cooling circuit; and
the cooling circuit is configured to activate responsive to the sensor sensing non-condensable gas in the medium.

16. The system of claim 1, wherein the medium is refrigerant.

17. A method of treating a medium in the refrigeration system of claim 1, comprising:
fluidly transporting the medium along the first fluid segment of the system between the condenser and the expansion valve; and
providing negative pressure to the separator assembly that is in fluid communication with the first fluid segment of the system.

18. The method of claim 17, further comprising:
determining an amount of the non-condensable gas that is in the medium; and
heating the separator assembly and/or pre-concentrating the non-condensable gas in the medium within the first fluid segment.

19. The system of claim 1, comprising:
a sensor operationally connected to the heating source, the sensor configured to sense the non-condensable gas in the medium when the system is active, wherein:
the first conduit and the bypass conduit include a respective plurality of control valves that selectively control flow of the medium between the condenser and the separator assembly; whereby flow of the medium between the condenser and the expansion valve is through one or both of the first conduit and the bypass conduit when the system is active; and
the sensor is operationally connected to the plurality of control valves; and one of the plurality of control valves is configured to transition to an opened state and another of the plurality of control valves is configured to transition to a closed state, or both of the plurality of control valves are configured to be at least partially opened, responsive to the sensor sensing non-condensable gas in the medium when the system is active.

20. A refrigeration system comprising:
a condenser; an expansion valve; a first conduit fluidly connecting the condenser and the expansion valve to define a first fluid segment through which a medium is transported when the system is active; and a separator assembly, operably disposed in the first fluid segment, configured to remove non-condensable gas from the medium when the system is active,
wherein the separator assembly includes:
a pump configured to generate negative pressure, thereby extracting the non-condensable gas from the medium through the separator assembly when the system is active;
a membrane with a pore size that is selectively tunable within a range having a low end and a high end, the low end being smaller than a molecular size of the medium when the medium is flowing in the first fluid segment of the system and the high end being larger than the molecular size of the medium when the medium is flowing in the first fluid segment of the system, and the separator assembly is reactive to heat for tuning the pore size of the membrane; and the membrane comprises zeolite; and a first housing for housing the membrane; and the first housing being coupled to the first fluid segment of the system, the membrane being disposed in the first housing; the first housing includes heating source that is a selectively controllable, and a cartridge that includes the membrane, the cartridge being removably disposed in the first housing;

wherein the system further includes:

a sensor operationally connected to the heating source, the sensor is operationally connected to the system, outside of the first fluid segment of the system, the sensor configured to sense the non-condensable gas in the medium when the system is active; and the heating source is configured to provide heat for tuning the pore size of the membrane responsive to the sensor sensing non-condensable gas in the medium;

an evaporator; and a second conduit fluidly connecting the expansion valve and the evaporator to define a second fluid segment of the system, wherein the sensor is operationally connected to the second fluid segment of the system;

a cooling circuit, operationally connected to the first fluid segment between the condenser and the separator assembly, configured to pre-concentrate the non-condensable gas in the medium when the system is active, the cooling circuit includes a second housing operationally connected to the first fluid segment of the system, the second housing including a heat exchanger configured for thermodynamically engaging the medium when the cooling circuit is active; the sensor is operationally connected to the cooling circuit; and the cooling circuit is configured to activate responsive to the sensor sensing non-condensable gas in the medium; and a bypass conduit, fluidly connected in parallel with the first conduit, between the condenser and the separator assembly, the bypass conduit being configured for at least partially bypassing the first conduit.

* * * * *